United States Patent Office 3,162,689
Patented Dec. 22, 1964

3,162,689
POLYCHALKOGEN ETHERS
Walter Reifschneider, Midland, Mich., assignor to The Dow Chemical Company, Midland, Mich., a corporation of Delaware
No Drawing. Filed June 27, 1962, Ser. No. 205,519
3 Claims. (Cl. 260—609)

The present invention is directed to thioethers and in particular is directed to novel thioethers corresponding to the formula

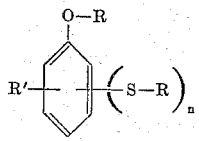

In the present specification and claims, each R independently represents a cycloalkyl of from 5 to 6, both inclusive, carbon atoms or alkyl group containing from 1 to 24, inclusive, carbon atoms, R' represents an alkyl group of from 1 to 4, inclusive, carbon atoms, and $n$ is an integer from 1 to 4, inclusive.

The novel compounds of lower molecular weight are colorless oils; those of higher molecular weight are crystalline solids appearing white to yellow in mass. All are of low solubility in water but readily soluble in various common organic sovents such as lower alkanols, benzene and the like. The compounds are useful as insecticides and herbicides; as inhibitors of the germination of fungus spores, or toxicants to mycelium, many of them are effective fungistats. The compounds are also useful as additives to improve the properties of lubricating oils especially designed for operation under high pressures and temperatures; they are useful as intermediates in the preparation of dyestuffs and biologically active materials; they (and especially those which are liquid at temperatures of use) are also of value as solvent additives in the modification of behavior of mixed solvent systems.

The compounds are prepared by a process which comprises the step of causing a reaction between an aromatic halide compound corresponding to the formula

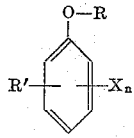

wherein X represents halogen, and a mercaptan compound corresponding to the formula

G—S—R

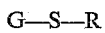

wherein G is hydrogen, an alkali metal, or cuprous copper. During the reaction to prepare the present compounds, $n$ molecules of mercaptan compound react with each molecule of aromatic halide. When it is desired to prepare the present compound in a high state of purity and with a minimum of post-synthesis purification procedure, the starting reactants should be employed in stoichometric proportions, or preferably, with the mercaptan in slight excess. However, other proportions can be employed if desired, and unconsumed starting material of whatever identity may, if desired, be recycled into further synthesis process.

The reaction goes forward at temperatures over a wide range, such as 20° to 350° C., but initiates most readily when heated to a temperature somewhat higher than room temperature; a preferred temperature range is from 100° to 250° C. Under these conditions the reaction is, in general, exothermic and goes forward to completion with good yield calculated upon the basis of consumed starting material. Hydrogen halide of reaction is evolved and means for its orderly disposal are advantageously provided.

Typically, in the preparation of the compounds of the present invention, reaction between the mercaptan starting material and the aromatic halide starting material will initiate and go forward only when there are employed, as catalytic agent a catalytic amount of both a source of cuprous ion and a nitrogenous base. Thus, in the preparation of many, and probably all of the present compounds, the employment of such catalyst is essential and critical, although the amount is not critical. Certainly the employment of such catalyst is in all cases highly advantageous. The source of cuprous ion can be metallic copper, in which case the copper reacts in some way to obtain cuprous halide. Also, cuprous oxide can be employed as a source of cuprous ion in which case water of reaction is evolved and cuprous halide results. Cuprous chloride itself or other cuprous salt can be employed. Also, employment of a cuprous salt of a mercaptan is satisfactory. The employed weight is not critical, but can vary from a very small trace amount, less than $\frac{1}{100}$ of 1 molar percent, to as much as an amount equimolecular with either reactant or even greater. In general, the employment of larger amounts is accompanied by no major advantage and, being expensive, is not preferred.

The nitrogenous base can be ammonia, a primary, secondary, or tertiary aliphatic or aromatic amine or a nitrogenous heterocycle wherein the nitrogen acts, or is capable of acting, as a basic substance. If desired, the nitrogenous base can be a naturally liquid substance which is employed as a reaction medium. Otherwise, such base is dissolved in inert liquid reaction medium, such as an aliphatic or aromatic hydrocarbon.

At least in laboratory preparations it may be preferred to employ the nitrogenous base catalyst substance in sufficient excess that portions of it also act as hydrogen halide acceptor and yet further portions continue to function, unreacted, in the necessary catalytic manner.

When mercaptan is employed and cuprous ion is provided by the inclusion, in the reaction mixture, of cuprous oxide in an amount equal to or greater than that amount equimolecular with the starting mercaptan, water of reaction is evolved in amount stoichiometric with consumption of the mercaptan. The extent to which the reaction has proceeded may be ascertained by measurement of this water or in various known experimental procedures such as the systematic sampling of the reaction mixture and its analysis in known methods to determine its composition at any given time.

In carrying out the reaction to prepare the compounds of the present invention, the aromatic halide and the mercaptan are intimately mixed and blended, in any order and in desired amounts, with source of cuprous ion and nitrogenous base as hereinbefore described, and thereafter heated, to a temperature at which reaction takes place promptly. In one convenient method of practicing the present method, the reaction temperature may be the boiling temperature of the liquid reaction medium. In this situation, heating may be continued at the boiling temperature of the reaction mixture and under reflux for a period of time to carry the reaction to completion.

Upon completion of the reaction, the desired compounds of the present invetnion are separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate usually forms from which the desired product can be extracted as a solvent-soluble fraction. Representative extraction solvents include diethyl ether, chlorinated hydrocarbons, and benzene. In any event, the reaction mixture or precipitate is extracted with solvent, the solvent extract dried over an inert drying agent such as, for example, anhydrous potassium carbonate or the like; the solvent vaporized and removed and the remaining product chilled or otherwise induced to crystallize and, if desired, recrystallized from a solvent such as a lower alkanol.

When production of the present compounds is to be carried out on an industrial scale, various other methods of separation and purification may be preferred, including, for example, centrifugation, decantation, vacuum distillation, and the like.

The following examples, without more, will enable those skilled in the art to practice the present invention.

*Example I.—3-Methyl-4-(Methylthio)Phenetole*

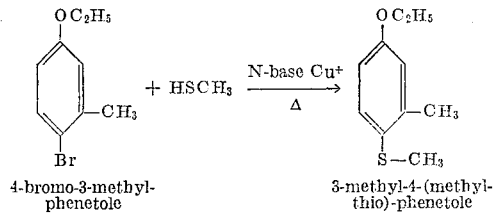

4-bromo-3-methyl-phenetole 3-methyl-4-(methyl-thio)-phenetole

A reaction mixture is prepared, consisting of 4-bromo-3-methylphenetole, cuprous oxide (technical grade) in an amount about ¼ equimolecular therewith, and sodium methyl mercaptide in an amount slightly more than equimolecular with the phenetole, all dispersed in a mixture consisting of 110 parts quinoline and 20 parts pyridine, by volume. The resulting reaction mixture is placed in a flask under reflux, the reflux being equipped with a water trap. In this situation, the reaction mixture is heated at its reflux temperature (a pot temperature between approximately 160° and 200° C.) for 6 hours to carry the reaction to completion. At the end of this reaction period, the resulting hot mixture is poured into a mixture of shaved ice and excess concentrated hydrochloric acid. As a result of these procedures, the ice melts and basic substances react with hydrochloric acid; in the resulting acidified water an oily, immiscible layer forms. This oily liquid is washed with water, and dried over a bed of anhydrous potassium carbonate to obtain an oily, pale yellow 3-methyl-4-(methylthio)phenetole product boiling at 145°–146° C. under pressure of 15 millimeters mercury, absolute. 3-methyl-4-(methylthio)phenetole is specifically herbicidal to grasses. An aqueous dispersion containing the present compound as sole toxicant applied to soil at a rate equal to 50 pounds per acre gave 100 percent control of live seeds and germinant seedlings of German millet and of milo: that is to say, all were killed.

*Example II.—4-Ethylthio-3-Methylphenetole*

In procedures essentially similar to the foregoing except that the starting mercaptan compound is the sodium salt of ethyl mercaptan, there is prepared, in good yield, 4-ethylthio-3-methylphenetole. The compound is a colorless, oily liquid boiling at 150°–151° C. under pressure of 15 millimeters mercury, absolute.

*Example III.—2,4-Bis(Ethylthio)-5-Methylphenetole*

In procedures essentially the same as the foregoing, 2,4-dibromo-5-methylphenetole is caused to react with an amount of the sodium salt of ethyl mercaptan twice that equimolecular with the phenetole, in the presence of a small amount of technical cuprous oxide in a mixture of 2 parts technical, 2, 4-lutidine and one part quinoline, as mixed liquid reaction medium. As a result of these procedures, there was obtained a 2,4-bis(ethylthio)-5-methylphenetole product as a colorless oil boiling at 163°–165° C. under a pressure of 3 millimeters mercury, absolute.

The compound, unmodified or as an aqueous dispersion, is specifically herbicidal to aquatic vegetation.

*Example IV.—Tertiarybutyl-Tris (1,1,3,3-Tetramethylbutylthio) Dodecylphenyl Ether*

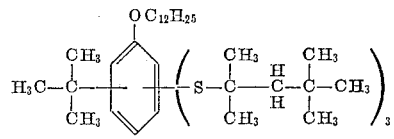

In the present example the aromatic halide starting material is an ar-tribromo-ar-t-butyl-dodecylphenyl ether. This starting material is a mixture of isomers naturally resulting from the procedures of preparation. The mercaptan reactant, 1,1,3,3-tetramethylbutylmercaptan, is supplied in an amount three times that equimolecular with the said ether as the uncombined mercaptan rather than as an alkali metal salt. The reaction is carried out in 1,4-dioxane as liquid reaction medium, in the presence of an amount of sodium carbonate, as hydrogen halide acceptor, almost equimolecular with the mercaptan, in the presence of about 5 mole percent of secondary isopropanolamine as nitrogenous base and also in the presence of about 5 mole percent of cuprous chloride as source of cuprous ion. The resulting reaction mixture is heated, at the boiling temperature and under reflux, for 6 hours to carry the reaction to completion. As a result of these procedures, there is obtained a tertiarybutyl-tris (1,1,3,3-tetramethylbutylthio)dodecylphenyl ether product as a glasslike solid which is recovered by diluting the reaction mixture with an excess of water whereupon the solid product precipitates therein, and thereafter filtering to remove product. The product is specifically fungicidal and is toxic to germinant spores of *Alternaria solani*.

*Example V.—Tetracosyl 2,3,5,6-Tetrakis (Methylthio)-p-Tolyl Ether*

In the present example, the halide starting material is an ar-tetrabromo-p-tolyltetracosyl ether. The ether starting material is a mixture of isomers but most of the tetracosyl groups are believed to be normal or nearly so.

The mercaptan reactant is the potassium salt of methyl mercaptan and is supplied to the reaction in an amount four times that equimolecular with the said halide starting material. The reaction is carried out in a commercial diethanolamine as liquid reaction medium and source of nitrogenous base catalyst component as well as neutralizing agent for hydrogen halide of reaction. To the resulting reaction mixture there is added also 25 mole percent by weight of cuprous acetate as source of cuprous ion. The resulting mixture is heated at approximately 150° C. for 6 hours to carry the reaction to completion. As a result of these operations, there is obtained a tetracosyl 2,3,5,6-tetrakis(methylthio)-p-tolyl ether. The compound forms initially in solution in the amine solvent and is separated therefrom by diluting the solvent with excess aqueous hydrochloric acid. From the resulting acidified mixture the desired ether product is removed, at first as an oily layer which, upon being recrystallized from toluene and cyclohexane, gives a yellow crystalline solid. The compound is toxic to germinant fungus spores and young mycelium.

*Example VI.—2-Ethyl-5-(Eicosylthio)Anisole*

Equimolecular amounts of 2-ethyl-5-iodoanisole and eicosyl mercaptan are intimately mixed and stirred together in a liquid reaction medium together with catalyst as in Example I and heated at the said reflux temperature for 6 hours to carry the reaction to completion. The procedures of separation and purification are essentially the same as those in Example I. As a result of these operations, there is obtained a pale yellow to white crystalline solid 2-ethyl-5-(eicosylthio)anisole product. The product is toxic to spores and proliferating mycelium of *Alternaria solani*.

In similar procedures, employing 4-bromo-3-isopropylphenetole and cyclopentyl mercaptan in equimolecular amounts, there is obtained a 4-(cyclopentylthio)-3-isopropylphenetole product as a crystalline solid. Also, by use of cyclohexyl mercaptan, a 4-(cyclohexylthio)-3-isopropylphenetole.

The mercaptans necessary as starting materials in the practice of the present invention are, for the most part, articles of commerce. However, those which are not can readily be prepared in known procedures such as, for example, the method of Pieverling. See Liebig's Annalen der Chemie, volume 183, pages 344–359, note especially page 349 and following. Other methods are well known to those skilled in the art.

I claim:
1. A compound corresponding to the formula

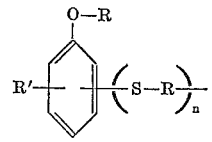

wherein each R independently represents a member of the group consisting of cycloalkyl of from 5 to 6, both inclusive, carbon atoms and alkyl containing from 1 to 24, inclusive, carbon atoms, R' represents alkyl of from 1 to 4 inclusive, carbon atoms, and $n$ is an integer from 1 to 4, inclusive.

2. 3-methyl-4-(methylthio)phenetole.
3. 2,4-bis(ethylthio)-5-methylphenetole.

No references cited.